COAXIAL CONNECTOR FOR PRINTED CIRCUIT BOARD

Filed Feb. 8, 1963 3 Sheets-Sheet 1

April 20, 1965 J. H. HUBER ETAL 3,179,912

COAXIAL CONNECTOR FOR PRINTED CIRCUIT BOARD

Filed Feb. 8, 1963 3 Sheets-Sheet 2

COAXIAL CONNECTOR FOR PRINTED CIRCUIT BOARD

Filed Feb. 8, 1963

3 Sheets-Sheet 3

United States Patent Office 3,179,912

Patented Apr. 20, 1965

3,179,912
COAXIAL CONNECTOR FOR PRINTED CIRCUIT BOARD

John H. Huber, Harrisburg, and William L. Schumacher, Camp Hill, Pa., assignors to AMP Incorporated, Harrisburg, Pa.

Filed Feb. 8, 1963, Ser. No. 257,395
10 Claims. (Cl. 339—17)

This invention relates to a coaxial connector of the type utilized to interconnect coaxial cable to circuit components. More particularly, the invention relates to an improved connect-disconnect coaxial connector particularly adaptable to interconnect coaxial cable signal paths to printed circuit signal paths.

The expanding use of coaxial cable has sponsored development of a wide variety of coaxial connectors of considerable complexity and cost. Many of such connectors include a dozen separate components which must be inter-fitted by hand in order to form an assembly serving a single coaxial cable. With prior art connectors utilized to interconnect printed circuit paths, the usual practice features coaxial connectors molded in multiple in dielectric blocks glued, riveted, or otherwise fastened to the printed circuit board carrying the paths to be connected. The structural complexity represented by such connectors places a cost burden on electronic systems resulting in the termination or connection cost being out of proportion to the total system cost. Furthermore, the multiplicity of components and of interconnections associated with such connectors serves to decrease reliability by numerically extending the opportunity for component failure.

In many instances the connection requirements of an electronic chassis call for a number of coaxial connections to individual and separated points on such chassis. The practice heretofore followed has been to feed all connections through a common multiple coaxial connector block to signal paths extended by wiring or printed circuit paths to the various points of application on the chassis. This practice results in the shielding given by the coaxial cable being substantially lost once connection is made with the chassis.

The present invention is directed to a coaxial connector construction solving the foregoing problems.

It is one object of the present invention to provide a coaxial connector for mechanically and electrically interconnecting coaxial signal paths to component signal paths.

It is a further object of invention to provide a coaxial connector of wide utility in use with the printed circuit boards.

It is still a further object of invention to provide a simple, compact and inexpensive coaxial connector capable of receiving and latching a coaxial cable termination.

It is another object of invention to provide an improved shielded connector construction capable of use proximate the point of signal path termination relative to coaxial signal input to electrical and/or electronic components.

It is yet another object of invention to provide a shielded signal terminal capable of individual or multiple mounting without the use of separate mounting members.

Other objects and attainments of the present invention will become apparent to those skilled in the art upon a reading of the following detailed description when taken in conjunction with the drawings in which there is shown and described illustrative embodiments of the invention; it is to be understood, however, that the embodiments shown are not intended to be exhaustive nor limiting of the invention but are given for purposes of illustration in order that others skilled in the art may fully understand the invention and the principles thereof and the manner of applying the invention in practical use so that they may modify it in various forms, each as may be best suited to the conditions of a particular use.

The foregoing objectives of the invention are attained by a novel coaxial connector assembly featuring a one-piece outer shell adapted to serve as an outer signal path or as shielding and further adapted to secure a dielectric plug therein containing a central pin member adapted to serve as an inner signal path. Integral with the connector shell is a member adapted to cooperate with a typical male coaxial connector half to serve in one embodiment as a spring member and in another embodiment as a latching member. Further integral with the connector shell are leg members which may be arranged in various different forms to secure the connector assembly to an insulating board and, at the same time, provide means for connecting or grounding the outer shell to conductive paths in such board. As will become apparent, the novel connector assembly of the invention accomplishes termination of coaxial conductors with a simple, three-member structure which provides both reliability with respect to continuity of electrical paths as well as proper electrical characteristics with respect to shielding.

In the drawings:

FIGURES 1, 5, 7 and 9 represent an exploded perspective of a typical printed circuit board mounting various components with distinct embodiments of the connector assembly of the invention shown in each of the figures;

FIGURES 2, 3 and 4 show the connector assembly of FIG. 1, FIG. 2 being in elevation, FIGURE 3 being an end-on-section of FIGURE 2 taken along lines 3—3; and FIGURE 4 being a side section taken along lines 4—4 of FIGURE 3;

Viewing now the composite represented by FIGURES 1, 5, 7 and 9, member 10 represents an insulating board of the type used for printed circuits or the chassis for electrical-electronic equipment such as computers, television sets and the like. A typical board used for this purpose is comprised of phenolic resin having copper sheet adhered thereto with appropriate conductive paths formed by etching away portions of copper to define distinct paths between various points selected for interconnection on the board. Boards of this type may have such paths formed on either or both sides thereof for contact with components such as 12, 18, 20 and 22 mounted in board apertures such as 14 and 16 shown mounting component 12.

Figures 1, 5, 9:
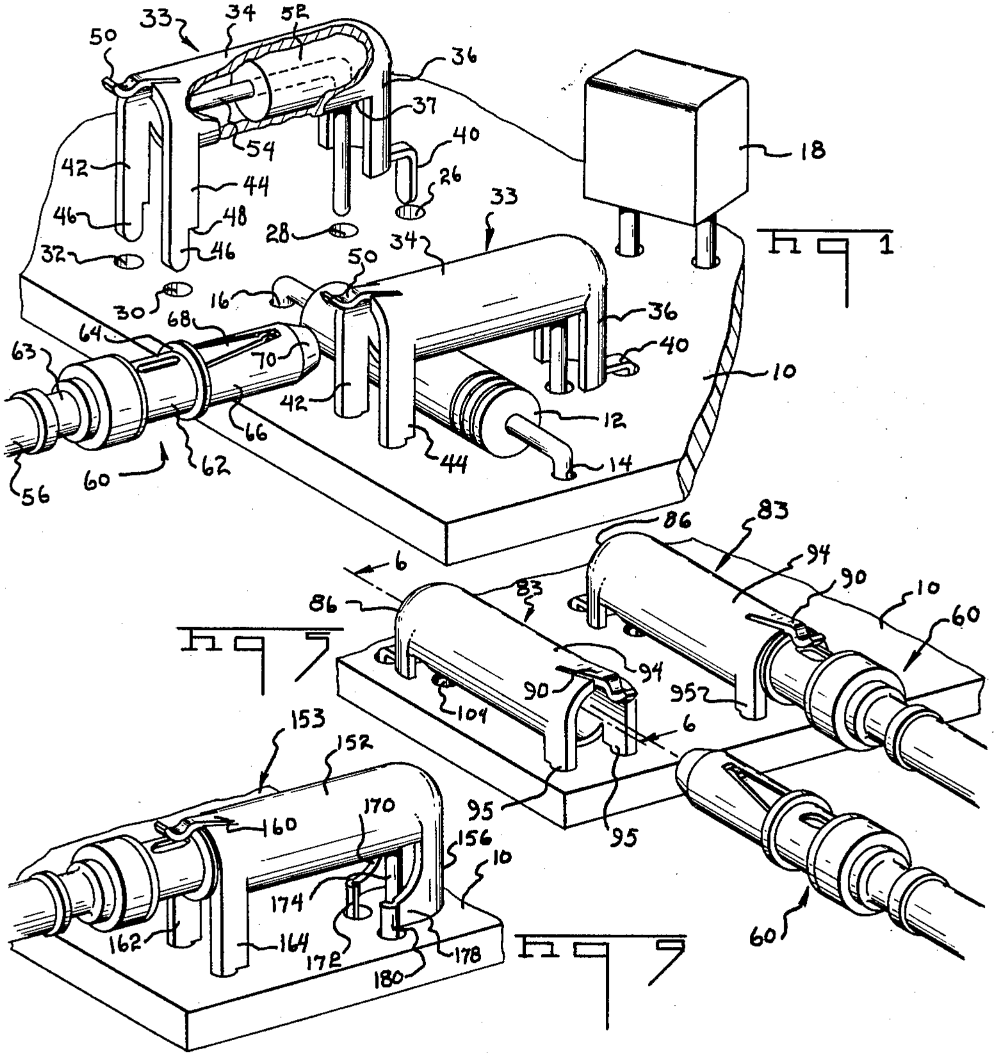

The connector assembly of the invention has the advantage of being mountable directly to the mounting board 10 at a point proximate to the particular interconnection to be made as indicated in FIGURE 1. This may be accomplished with respect to single cables employing only one connector assembly or with respect to multiple cables by employing assemblies in multiple as indicated in FIGURE 5.

Turning now to FIGURE 1, and a more detailed description of the invention, there is shown one embodiment of the coaxial connector asembly of the invention 33 poised above a section of board 10 preparatory to mounting therein in board apertures 26, 28, 30 and 32. With the particular board shown in FIGURE 1, it may be considered that printed circuit conductive paths are disposed on the bottom face of the board with an appropriate auxiliary or grounding path proximate apertures 26, 30 and 32 and a signal path proximate aperture 28. Each of the identical assemblies 33 shown in FIGURE 1 includes a one-piece outer shell having a tubular portion 34 and an elbow portion 36 including an elbow mounting tab 40 at one end. At the other end extending from 36 are anchoring legs 42 and 44 each having a tab portion defined by a flange 46 off-set as at 48 as shown with respect to leg 44. Also integrally formed with 34 at the same relative end with legs 42 and 44 is a spring member 50 adapted to engage and hold a male coaxial connector half therein. Secured within 34 is an insulating plug 52 housing a central pin 54 having a 90 degree bend proximate its mid-length such that the pin is coaxially disposed within the surface areas defined by 34 and 36. The under portion of 34 adjacent 36 is relieved as at 37 to aid in maintaining coaxial spacing.

Adjacent assembly 33 is an identical assembly shown secured in board 10 with the leg tab portions and the elbow tab portions inserted in board apertures along with the connector pin coaxial with elbow portion 36. As indicated in FIGURE 1, the construction of the embodiment of the invention permits the assembly to be mounted in what might otherwise be considered an awkward position with respect to connector assemblies of the prior art; namely, the assembly is mounted straddling an electrical path on the circuit board or an electrical component such as 12. This feature can be of considerable advantage relative to either circuit board design or modifications of existing circuits with respect to adding coaxial terminations.

Shown further in FIGURE 1, aligned with mounted assembly 33, is a male coaxial connector half 60 of a type generally well known in the art for use in terminating coaxial cable such as 56. A more complete description of the coaxial connector assembly 60 may be found in U.S. Patent application Serial No. 77,114 filed December 20, 1960, now abandoned, in the name of Michael O'Keefe et al. For the purpose of the present description, assembly 60 may be considered as having a one-piece outer metal shell 62 as its forward portion, which is crimped or otherwise fastened to a rear shell portion 63 in turn crimped or otherwise fastened to an outer conductor which is usually metallic braid and which is usually disposed under the insulating sheathing of coaxial conductor 56. Centrally disposed within shell 62 and held thereby is a connector socket (not shown) adapted to be held by a dielectric insert 70, the end of which is shown protruding from the end of shell 62. In the forward portion 66 of shell 62 there is included a spring member 68 slightly raised from the peripheral dimension of shell 66 to stablish a wiping contact with the interior of shell portion 34 of connector 33. Centrally disposed and integral with shell 62 is a raised flange 64 adapted to serve as a stop member with respect to insertion of 60 into assembly 33. As will be made apparent from further figures, upon insertion of 60 into 33, flange 64 cooperates to snap under the end of spring 50 and thereby secure assembly 60 within 33. During insertion, connection is made with the center conductor by reason of the inner connecting socket sliding over pin member 54 to define a contact surface therewith. In this position a coaxial connection is completed which is both mechanically and electrically superior.

Figure 2:
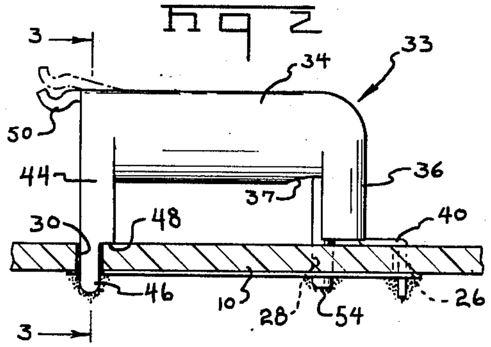
Figure 3:
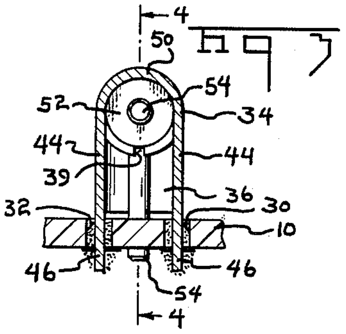
Figure 4:
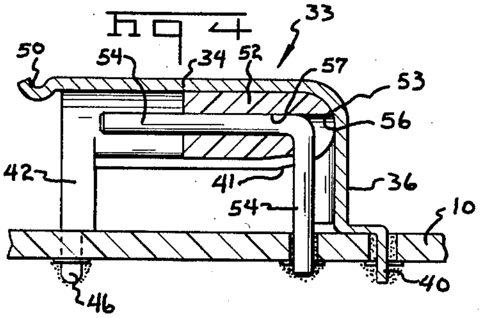

Viewing now further details of connector assembly 33, FIGURES 2, 3 and 4 show the disposition of insulating insert 52 and central conductor pin 54 secured within 34. As will be apparent from FIGURES 2 and 4, the insulating insert 52 is generally cylindrical in the forward portion thereof with respect to its outer configuration and rounded in the rearward portion to complement the interior surface of elbow portion 36. Provided in the rearward portion is a slot 56 connected to a bore 57 coaxially disposed along the length of the insert. As a matter of preference, the dimensions of slot 56 and bore 57 are made approximate the greatest dimension or diameter of pin 54 for ease of insertion during assembly.

The preferred method of assembly calls for a first insertion of pin member 54 within insert 52. With the shell portion 34 slightly spread apart such that the space between abutting surfaces identified as 39 in FIGURE 3 is slightly wider than the diameter of pin 54, the insert 52 having pin 54 mounting therein may then be inserted within the mouth of 34 and displaced rearwardly until the nose portion 53 thereof nests in elbow 36. Thereafter, 34 is closed to the configuration shown in FIGURE 3 and crimped proximate relieved portion 37 to form indentations 41 slightly penetrating into the insert material as indicated in FIGURE 4. This procedure has been found quite adequate to secure insert 52 and pin 54 within the assembly shell. Thereafter, the assembly 33 may be inserted as indicated in FIGURE 1 to provide a coaxial termination to circuit board 10.

The assembly 33 provides a simple three piece construction capable of accommodating coaxial conductors in a mechanical and electrical connection to circuit paths. At the same time the assembly construction maintains to a considerable extent a constant spacing between outer and inner signal paths to provide proper electrical characteristics for the accomplished connection.

Figure 6:
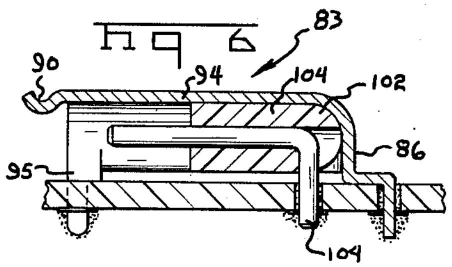
FIGURE 6 shows a sectional elevation of the assembly of FIG. 5 taken along lines 6—6 of FIGURE 5.

Viewing now FIGURES 5 and 6, a further embodiment of the connector assembly of the invention is shown with two connectors 83 shown mounted to provide an edge connection in board member 10 to receive male coaxial connector halves 60. The embodiments shown in FIGURE 5 may, of course, also be utilized centrally disposed in an insulating board member, and the other assembly embodiments of the invention can, of course, be edge mounted.

The assembly 83 is substantially identical to the embodiment shown and described with respect to FIGURES 1–4 relative to the connector shell portion and insulating insert. Thus, assembly 83 includes a tubular portion 94 having an elbow portion 86 at one end and a connector entry including a spring member 90 at the other end. A dielectric insert 102 is secured within shell 94 in the same manner as the insert described with respect to the embodiment of FIGURES 1–4. The difference between the embodiments of FIGURES 5 and 6 and that above treated lies in the relative length of the elbow portion 86, forward legs 95 and the vertical portion of pin member 104; all being abbreviated to effectively lower assembly 83 to the surface of the board member 10 in which it is mounted. The embodiment represented by assembly 83 may, in certain instances, be preferred to the assembly 33 wherein optimum strength and stability relative to the board member 10 is necessary. An application typifying such use is in vehicles wherein the problems of vibration and inertia are aggravated and of prime importance.

Figure 7:
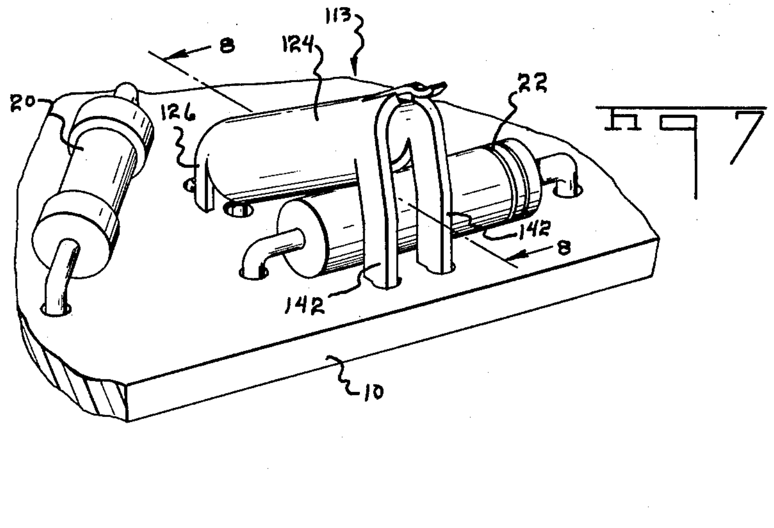
Figure 8:
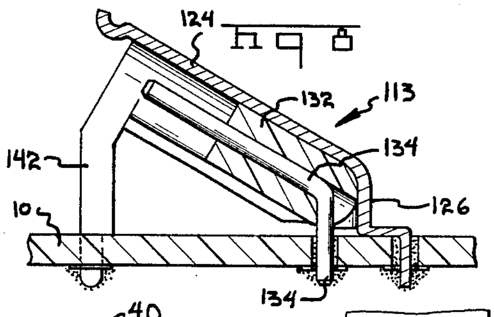
FIGURE 8 shows a sectional elevation of the assembly of FIG. 7, being a section taken along lines 8—8 of FIGURE 7.

Turning now to a further embodiment of the invention, FIGURES 7 and 8 depict an assembly 113 adapted for angular mounting in an insulating board member 10. Assembly 113 includes an outer shell member having a tubular portion 124 and an elbow portion 126 having longitudinal axes separated by an angle of approximately 120 degrees. Fitted within portion 124 is an insulating insert 132 securing an insulating pin 134 having sections coaxial with each portion 124 and 126 as in the above embodiments described. The basic difference between assembly 113 and the assemblies described above lies in the relative disposition of portions 124 and 126 as indicated; the back portion of 126 and the vertical portion of pin 134 being abbreviated while the forward legs 142, integral with 124, are disposed at an angle relative to the shell axis to provide vertical mounting. A comparison of FIGURE 2 and FIGURE 8 will show the assembly 113 to be fully compatible in use with the assembly 33. The embodiment represented by assembly 113 is preferred when the disposition of coaxial cables to be attached to a board such as 10 relative to components or paths on board 10 is such as to make an elevated approach desirable.

A comparison with assemblies 33, 83 and 113 should indicate the flexibility of the assembly of the invention with respect to answering various coaxial termination needs. Such comparison should also indicate that numerous other embodiments are contemplated with respect to either the height or angular disposition of the assembly of the invention.

Figure 10:
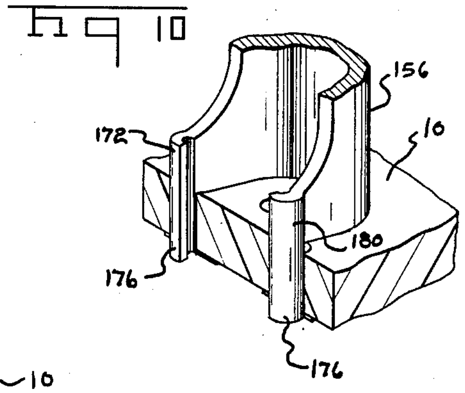
FIGURE 10 shows a partial perspective of the rear portion of the connector assembly shown in FIGURE 9.

The embodiment of the assembly of the invention shown in FIGURES 9 and 10 represent an alternative feature fully adaptable to the various embodiments heretofore described. Thus, as shown with respect to FIGURE 9, there is included coaxial connector assembly 153 having tubular portion 152 and an elbow portion 156 housing a dielectric insert (not shown) and a central coaxial pin member 174. Integral with the forward portion of section 152 are legs 162 and 164 and a spring member 160 identical in detail and function to similar members in the embodiments shown in FIGURE 1. The difference in assembly 153 lies in the means of anchoring elbow section 156 which includes integral therewith parallel continuations of the lower surface of 156 forming flanges 170 and 178 carrying anchoring tab members 172 and 180, respectively. Each of the flange tab members includes a vertically disposed curled portion as indicated by numeral 176 with respect to tab 172. The provision of such curled portions has been found to assist in providing a superior mechanical and electrical connection of connector assemblies of the type shown by the invention through a wicking action with respect to solder. When electrical circuits are made and solder applied to the apertures of board 10 carrying curled tab portions, the solder is drawn well up into the curled portion to not only increase the surface contact area but better support the tab portions within the board member. The embodiment represented by assembly 153 with respect to the disposition of the tab anchoring means, represents an alternative structure having greater rigidity, having an increased center contact shielding and occupying less space than the above embodiments.

Figure 11:
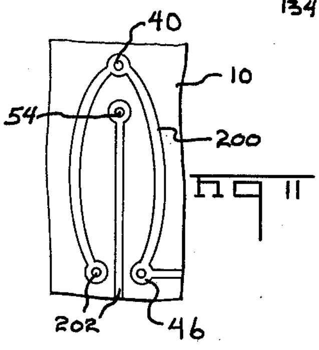
FIGURES 11 and 12 show printed circuit paths useful in conjunction with the embodiments of the connector assembly of the invention.
Figure 12:
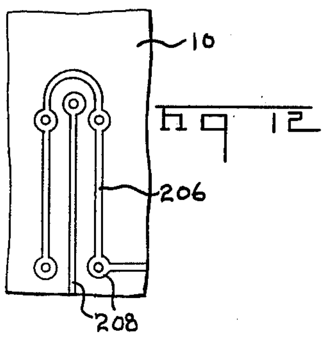

FIGURES 11 and 12 indicate preferred arrangement of printed circuit paths linking the signal paths represented by the assemblies of the invention. The views shown in 11 and 12 may be considered as taken of the under surface of board member 10 although such might, as heretofore indicated, be on the upper surface of the board. FIGURE 11 depicts one conductive path 200 adapted to interconnect with the outer conductive shell or shield part of the coaxial connector assembly shown in FIGURE 1; the ends of tab portions of 40 and 46 being shown for identification of the orientation contemplated. Conductive path 202 represents the signal path associated with the central conductor of the assembly shown in FIGURE 1; the end of pin member 54 being shown. FIGURE 12 is a similar view of a preferred interconnecting printed circuit path used with the assembly 153 shown in FIGURE 9. The outer conductive path 206 interconnects with the various tab portions of the connector outer shell and the inner path 208 connects with the central pin member of the connector assembly. The type of connections shown in FIGURES 11 and 12 are preferred in applications wherein the assemblies of the invention are utilized with circuits requiring inter-component shielding; the outer conductive path of the board paths serving this shielding function to some extent.

Figure 13:
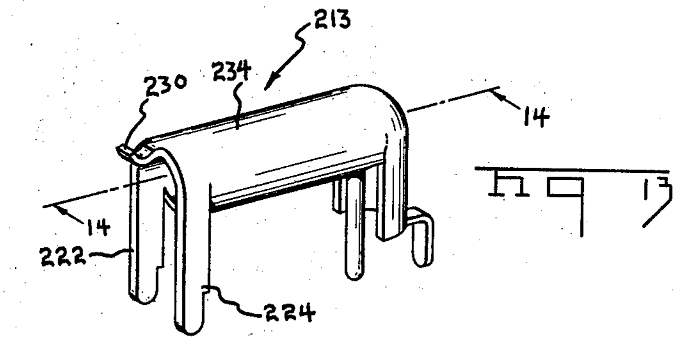
FIGURE 13 shows a perspective of yet a further embodiment of the invention related to the novel latch means of the invention.
Figure 14:
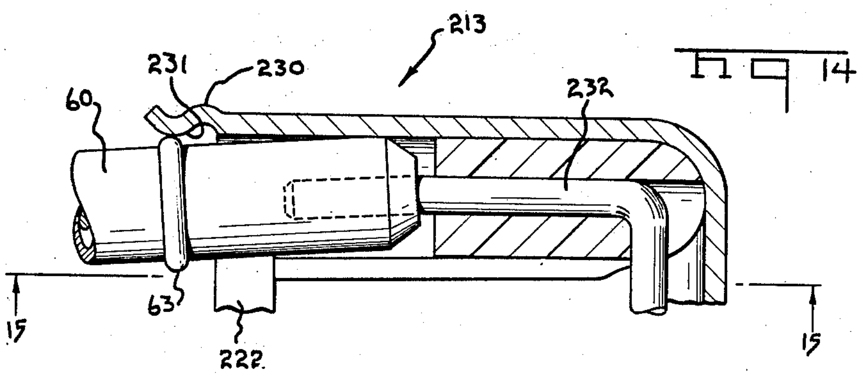
FIGURE 14 shows an enlarged section taken along lines 14—14 of FIGURE 13 with the addition of a male coaxial connector introduced into the connector assembly to demonstrate the operation of the latch means.
Figure 15:
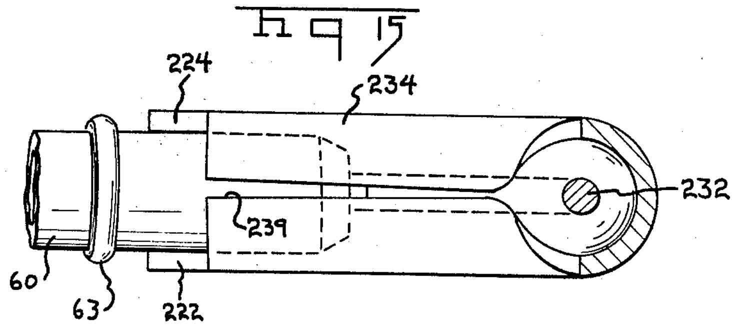
FIGURE 15 shows a view of the underside of the assembly shown in FIGURE 14 as taken along lines 15—15.

FIGURES 13, 14 and 15 show a further feature adaptable to any of the embodiments heretofore shown and described. In this embodiment, a connector assembly 213 may be considered as identical in structure and function to the embodiment shown and described with respect to FIGURE 1 with the exception of the member 230. As will be apparent from FIGURE 13, member 230 is formed to extend from shell 234 without the cantilevered length provided with respect to the spring member of the embodiments of above such as member 50 in FIGURE 1. Member 230 is of the same relative thickness as shell 234 and of a length relatively short to such thickness and practically speaking, incapable of bending. The curved disposition of member 230 adds to the rigidity thereof with respect to bending moments. Because of this, member 230 serves as a latch preventing direct axial insertion or withdrawal of coaxial connector half 60 into shell 234.

FIGURE 14 shows a coaxial connector half 60 inclined relative to the central axis of assembly 213 as it must be for either insertion or withdrawal; the diameter being sufficient to permit flange 63 of 60 to engage the curved surface 231 of 230. Upon insertion or withdrawal, the bottom portion of shell 234 spreads apart as indicated in FIGURE 15, the space 239 opening up as indicated to accommodate the insertion of connector half 60. As 60 is inserted, the forward edge of 63 will strike the outer turned-up end of 230 necessitating movement of 60 downwardly for further insertion. Following this insertion, spring force operates to drive 60 upwardly with 63 coming to rest in a nesting relationship in the inner curved portion of surface 231; 60 then being in coaxial alignment within 213. The lower wall sections of 234 provide the spring action driving 60 upwardly at the proper degree of insertion, such movement being related to the inner surface 231. The provision of central connector spring members of connector half 60 shown in FIGURE 1 assures that the central conductor thereof will mate with pin 232 in a proper fashion, notwithstanding the required cocking of 60 for insertion. The thickness of the metal sheet material utilized in portion of 234 should, of course, be such as to permit the spring action shown in FIGURE 15 without displacement of forward legs 222 and 224.

For the purpose of assisting practice of the present invention, but without intention to in any way restrict the scope intended to be covered, the following list of materials and dimensions of an actual unit are included:

Outer shell material—spring brass
Outer shell thickness—0.014 inch
Insulating insert material—polypropylene
Insulating insert diameter—0.179 inch Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims.

We claim:

1. In a connector assembly of the type adapted to electrically and mechanically interconnect coaxial cable to circuit paths disposed on an insulating member, the improvement comprising a one-piece shell of conductive material having a tubular portion defining a connector-receiving cavity and a semi-cylindrical portion angularly disposed with respect to the tubular portion, a pair of leg members extending from the tubular portion, including end tab extensions adapted to fit within insulating member apertures and at least a further leg member extending from the semi-cylindrical portion including a tab member adapted to fit within an insulating member aperture, the leg members serving to secure the shell in the insulating member and providing an electrical path between the shell and the circuit paths disposed the insulating member; an insert of insulating material fitted within the tubular portion extending into the semi-cylindrical portion, the insert including a central bore and an end-positioned slot, a conductive pin member inserted and held within said bore including a portion extending through the semi-cylindrical portion, the said pin member being coaxially disposed with respect to the interior surface of the shell.

2. The combination of claim 1 wherein the pair of leg members and the semi-cylindrical portion are of substantially the same length to support the shell for horizontal mounting of coaxial connector members relative to a planar surface of the insulating member.

3. The combination of claim 2 wherein the length of the pair of leg members and the semi-cylindrical portion is sufficient to define a substantial clearance between the bottom portion of the tubular portion and an adjacent planar surface of the insulating member.

4. The combination of claim 2 wherein the length of the pair of leg members and the semi-cylindrical portion is limited to provide a small clearance between the tubular portion and an adjacent planar surface of the insulating member.

5. The combination of claim 1 wherein the length of the pair of leg members is substantially greater than the length of the semi-cylindrical portion to define an angular support for the tubular portion relative to an adjacent planar surface of the insulating member.

6. The combination of claim 1 wherein the tubular portion includes a detent member extending from the end thereof opposite the semi-cylindrical portion, the said detent member having a curved surface extending into the plane defined by the upper interior surface of the tubular portion and adapted to engage a detent member of a coaxial connector half when inserted within the tubular portion.

7. The combination of claim 6 wherein the detent member is joined to the tubular portion at a point removed from the end thereof to define a substantial-length detent relative to the thickness thereof providing spring qualities to the detent.

8. The combination of claim 6 wherein the detent member is joined to the tubular portion at the end thereof to define a length relative to the width thereof to resist bending movements in the detent.

9. The combination of claim 7 wherein the tubular portion includes lower wall sections having spring qualities and adapted to yield responsive to insertion or withdrawal of a coaxial connector half within the tubular portion, the wall sections acting to hold the coaxial connector half against the upper interior surface of the tubular portion.

10. A coaxial connector assembly adapted to electrically and mechanically secure coaxial cable to a printed circuit board including a one-piece outer tubular shell having leg members adapted to secure the shell to a printed circuit board and provide an electrical path to circuits therein, the tubular shell having a detent of a length relative to the thickness thereof such as to resist bending moments thereof, the detent being disposed at an end of the tubular shell proximate the area of entry of a coaxial connector half and including a curved surface to define a face on said detent which engages the coaxial connector half to resist withdrawal thereof from the tubular portion, the detent having a further curved interior surface forming a recessed volume adapted to accommodate the coaxial conductor half and the tubular shell having spring walls sections opposite the detent adapted to drive the coaxial conductor into the detent face.

References Cited by the Examiner

UNITED STATES PATENTS

| | | | |
|---|---|---|---|
| 2,958,065 | 10/60 | Flanagan | 339—17 |
| 3,012,307 | 12/61 | Felts | 339—17 |

OTHER REFERENCES

Buggie: HHB Catalog, page 20, Apr. 1, 1958, 339-17.

JOSEPH D. SEERS, *Primary Examiner.*

ALFRED S. TRASK, *Examiner.*